March 15, 1955   A. B. SOWTER   2,703,998
METHOD OF PRESSURE WELDING
Filed May 4, 1951   2 Sheets-Sheet 2

INVENTOR
ANTHONY BAGNOLD SOWTER
BY
ATTORNEY

United States Patent Office 2,703,998
Patented Mar. 15, 1955

2,703,998

METHOD OF PRESSURE WELDING

Anthony Bagnold Sowter, Wembley, England, assignor to The General Electric Company Limited, London, England Application May 4, 1951, Serial No. 224,500

Claims priority, application Great Britain May 4, 1950

3 Claims. (Cl. 78—470.1)

The present invention relates to pressure welding, such as cold pressure welding, i. e. the joining of members of ductile metal such as aluminum, copper, etc., substantially by pressure applied to the members to be welded.

As is well known, in cold pressure welding, as described in detail in my U. S. Patent No. 2,522,408, a suitable design of the pressure welding tools and control of the tool pressure or penetration into the material being welded, after properly cleaning of the areas of contact to be joined to remove surface oxide and other matter foreign to the metal, will result in a plastic flow of the metal of the adjoining surfaces, to result in a solid phase welding joint or bond.

The same applies to pressure welding using some external heat applied to the members to be welded, where welding is, however, essentially effected as a result of the pressure-induced plastic flow of the metal of the adjoining surfaces, to cause a merging or bonding into a solid phase weld. The additional heat may be supplied to the members by either heating the pressure welding tools or the members may be preheated before insertion between the tools.

The present invention has for its object the provision of a simple method for welding studs or the like to plates, discs, or other members by a pressure welding, in particular cold welding, technique.

According to one aspect of the present invention, a method of forming a stud or the like upon a plate or other member, both said stud and plate or other member consisting of ductile material capable of being pressure welded, comprises providing on that end of the stud to be attached to said plate or member a flange whose surface where it engages said member, before attachment, generally conforms with the surface of said member, and welding said flange to said member by pressure welding.

According to another aspect of the invention, a method of welding a stud or the like to a member, both the stud and the member consisting of material capable of being pressure welded, comprises providing a flange on the end of said stud to be attached to said member, boring or providing a hole in the member through which the shank of the stud passes with a close fit, and forging and pressure welding said flange to said member to produce a welding bond or joint having a smooth finish between said flange and member.

As an example, in welding an aluminum stud to an aluminum plate, the stud, which may be screw-threaded, is provided with a flat circular flange at one end, the other end being passed through a fitting hole in the plate until the flange rests up against the back of the plate. The flange is then pressure welded to the plate and deformed or flattened by a simultaneous forging operation, to become completely embedded in the plate and to provide a smooth finish between the plate and flange.

In welding the flange to the plate or other member, one or more indentation spot welds may be made or advantageously the weld may be effected by an interrupted ring weld technique as described in the above-mentioned patent. The flange itself may be formed on the stud by upsetting a piece of aluminum rod which forms the shank of the stud.

The above and ancillary objects and novel features of the invention will become more apparent from the following detailed description considered in conjunction with the accompanying drawings, forming part of this specification, and in which.

Like reference characters identify like parts in the different views of the drawings.

Figure 1:
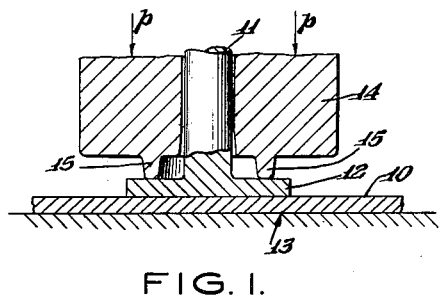
Figure 1 shows a tool arrangement for pressure welding a flanged stud unto another member, the parts being shown prior to welding.

Referring to Figure 1, there is shown a first member 10, such as a plate to which is to be secured a stud 11 for any purpose, such as for attaching a handle or the like. For this purpose, the stud is provided at one end with a flange 12 which may be produced in any suitable manner and which is secured to the member 10 by pressure welding. The areas of contact of the plate 10 and flange 12 to be joined are suitably cleaned, such as by mechanical scratch-brushing, to remove surface oxide and other matter foreign to the metal. Both the stud and member consist of pressure weldable material such as aluminum, copper, or a suitable metal alloy.

The flange 12 and plate 10 are then arranged with the cleaned surfaces in contacting relation and inserted between a pair of welding tools shown to consist, in the example shown, of a lower platen or flat anvil 13 and an upper tool 14 having a flat surface and projecting therefrom a plurality of welding tips or slightly tapered projections 15 and being provided with a central bore to receive the shank 11 of the stud. The anvil 13 and tool 14 are part of a suitable press (not shown) designed to supply adequate welding pressure, as indicated by the arrows $p$ in the drawing.

The tips 15 are advantageously in the form of arc-shaped projections, as shown in the above-mentioned patent and described in greater detail in my further co-pending application Serial No. 165,521, filed June 1, 1950, entitled Means for and Method of Cold Pressure Welding, to result in an interrupted ring weld as a result of the pressure welding operation. For optimum results, the radial width of the welding tips 15 should be about 1.5 times the thickness of the flange 12 which, in turn, may be of equal or lesser thickness than the plate 10. The height of the tips 15 is determined by the characteristics of the material to result in a definite percentage reduction or tool depression at the weld or welds, so as to produce an efficient welding bond with a minimum of metal distortion. If the flange 12 and member 10 are of equal thickness, the minimum percentage reduction of the total initial thickness is about 60% in the case of aluminum and 85% for copper and varies in accordance with the hardness of the material.

If the flange 12 is of a lesser thickness than the thickness of the plate 10, then the width and height of the welding tips 15 will be determined by the thickness of the flange alone, the percentage reduction or tool depression in this case being about 120% of the flange thickness in the case of aluminum and varying for other metals in accordance with the "Figure of Merit" as given in the above-mentioned patent.

Figure 2:
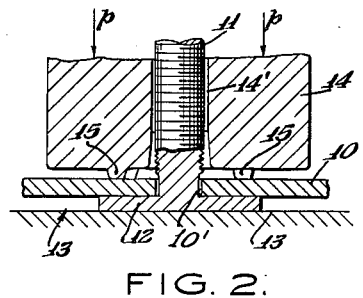
Figure 2 shows a similar arrangement for both pressure welding and forging the flanged stud, to provide a smooth finish of the parts upon welding.

Figure 2 illustrates a modification of a tool arrangement and method of joining a flanged stud to a plate, to obtain a joint with a smooth finish or thickness equal to the thickness of the member to which the stud is secured. This is obtained by a combined welding and forming operation, as will be further understood from the following.

Referring, by way of example, to the drawing, Figure 2, the plate 10 may be of commercial purity aluminum and 0.064 inch thick. It is flat and grease free and at the point where the stud 11 is to be welded to it, has a circular hole 10' the size of which is just sufficient for the shank of the stud to pass through. The stud 11 is formed from commercial purity aluminum stock by a cold heading operation although it may be formed from an aluminum alloy, which is harder than commercially pure aluminum and takes a thread better. The stud 11 is about ¾ inch long, is provided with a thread over the major portion of its length and has a head 12 of ⁷⁄₁₆ inch diameter and thickness of ¹⁄₁₆ inch.

Before the plate 10 and stud 11 are assembled as shown in Figure 2, the lower surface of the plate 10 around the hole 10' and at least for a distance from the center of the hole equal to the radius of the stud head or flange 12, is cleaned by mechanical scratch-brushing, to remove any oxide or impurities from the surface of the plate before welding. The underside of the head 12 is similarly treated (the upper surface in Figure 2) so that the meeting surfaces of the stud and plate are both clean.

Figure 3:
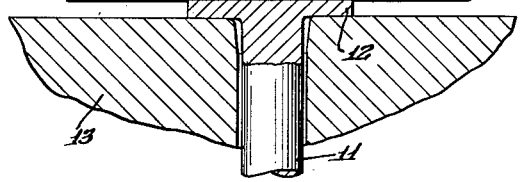
Figure 3 is a cross-section through a stud welding joint obtained by means of a tool according to Figure 2.

The tools for effecting the cold pressure weld of the stud 11 to the plate 10 comprise a lower flat anvil 13 of tool steel and an upper tool 14 of tool steel suitably hardened and tempered. The tools are placed between the platens of a press (not shown), such as a small hydraulic press, which is capable of delivering the necessary pressure of the order of 3–5 tons total thrust. The tool 14 has a ³⁄₁₆ inch diameter through hole 14' relieved at the lower end, that is at that end adjacent the other tool 13, to facilitate removal of the welded components after the welding operation, this relief forming the ridge 11' on the welded stud as shown in Figure 3. On its lower face, the tool 14 is provided with three welding tips 15 for making an interrupted ring type weld, the tips 15 being symmetrically arranged 120° around the hole 14'. The radial width of each of the tips 15 at its base is ³⁄₃₂ inch, that is about 1.5 times the thickness of the plate 10, and the gaps between the tips are ³⁄₆₄ inch. The welding tips 15 taper very slightly towards their free ends and project a distance of 0.026" from the lower face of the tool 14. All the sharp corners of the tool profile are relieved by stoning.

In order to carry out the welding operation, the plate 10 and stud 11 and tools 13 and 14 are set up as shown in Figure 2 and pressure applied by a press across the whole, as indicated by the arrows p, to drive the welding tips 15 into the material of the plate 10. Pressure is applied until further movement between the tools 13 and 14 is arrested by the flat surface of the tool 14 engaging the upper surface of the plate 10 and when the spacing between the tools is equal to the thickness of the plate 10. The metal of the head 12 flows into the thickness of the plate 10 and the radially outward flow of the metal produced by the welding tips 15 together with some radially inward flow of metal, causes the adjacent surfaces of the plate 10 and head 12 to weld together.

The radially inward flow of metal produces something of a hobbing action and the length of the stud shank is slightly increased. Figure 3 shows a cross-section through the finished weld and it will be seen that the tips 15 of the tool 13 form depressions 16, while the gaps between the tips leave upstanding radial ribs. The underside of the weld takes a smooth finish depending upon the surface of the lower tool or anvil 13. The ultimate thickness of metal in the depressions 16 is substantially equal to the thickness of the plate 10 minus the height of a tip 15, that is 0.064" minus 0.026" which is equal to 0.038", a reduction of about 70% in the combined initial thickness of the head 12 and plate 10 or about 40% of the single thickness of said head or plate having taken place.

Figure 4:
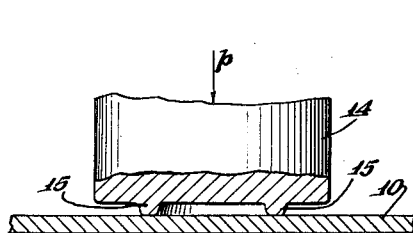
Figure 4 shows a modification of the tool arrangement of Figure 2.
Figure 5:
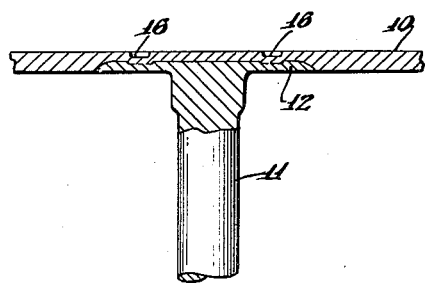
Figure 5 is a cross-section through a finished joint obtained by means of a tool shown in Figure 4.

In using a tool arrangement according to Figure 2, the smooth surface of the member 10 in the final welding position will be on the side of member 10 opposite to the stud 11, as shown in Figure 3. If, a smooth surface of the member 10 is desired on the side of the stud 11, this may be obtained by means of a modified tool arrangement shown in Figure 4, wherein the flange 12 adjoins the anvil 13 and the stud 11 passes through a bore in said anvil. Plate 10 is again superimposed upon the stud 12 and welding effected by a tool 14 having either straight or arcuate welding tips, in a manner readily understood from the foregoing. A cross-section to the final weld or joint in this type is shown in Figure 5.

Figure 6:
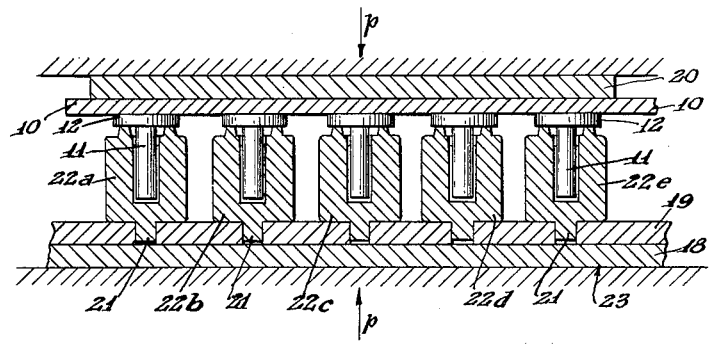
Figures 6 and 7 illustrate jig arrangements for making multiple stud welds of the type according to Figures 1 and 2, respectively.

In a similar manner, a number of studs may be welded in fixed positions on a plate by a jig consisting of three flat plates 18, 19 and 20, Figure 6, the central one of which is bored at the required spacing of the studs as shown at 21. Suitable tool inserts 22a, 22b, 22c, etc., fit in the holes in the central plate and the sandwich of the three jig plates and the plate 10 to which the studs 11 are to be welded may be placed, with the headed studs in position on the tool inserts, in a press for applying the necessary welding pressure. Thus, in setting up in the press, first one plate 18 of the jig is laid upon the lower platen 23 of the press then the plate 19 with the holes. The tool inserts 22a, 22b, 22c, etc. are then mounted in the holes and the studs 11, with the heads or flanges 12 uppermost placed upon the tool inserts. The plate 10 to which the studs are to be welded is then put on top and then the last plate 20 of the jig is put on and pressure applied across the sandwich between the lower and upper platens 23 and 24 of the press, to weld the studs to the plate.

Figure 7:
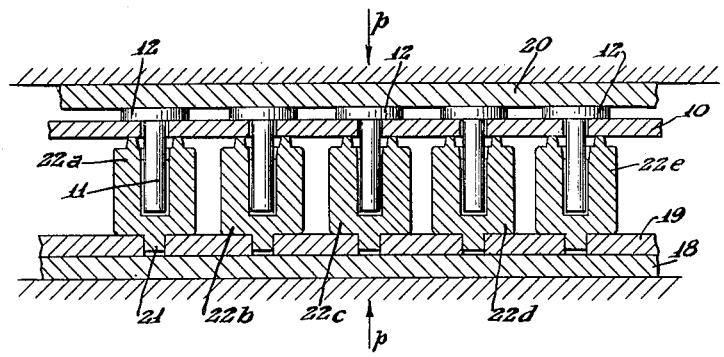

Figure 6 shows a jig for simultaneous welding multiple studs to a plate or member by a standard ring weld technique, corresponding to the tool shown in Figure 1. If a smooth joint or finish is desired, in the manner shown in Figure 3, a jig arrangement according to Figure 7 may be used which differs from Figure 6 by the plate 10 being perforated and mounting of the studs 11 in reversed position with the flanges 12 adjoining the top plate 20, in substantially the same manner, as shown in Figure 2.

In the foregoing, the invention has been described with specific reference to a few illustrative devices and methods. It will be understood, however, that modifications and variations, as well as the substitution of equivalent elements and steps for those shown herein for illustration, may be made without departing from the broader scope and spirit of the invention. The specification and drawings are accordingly to be regarded in an illustrative rather than in a limiting sense.

I claim:

1. A method of securing a first relatively small metal member to a second larger metal member, both said members consisting of cold pressure weldable material, comprising providing the areas of contact to be joined with uncontaminated metallic surfaces, supporting said first member by a surface extending beyond its periphery, placing said second member upon said first member with the cleaned areas in contacting relation, applying without the use of external welding heat to a substantially closed strip-like welding area of said second member within and being equally spaced from the periphery of said first member a pressure, to effect an indentation at said area and to create an interfacial metal flow conducive to pressure welding of said members thereat, and while continuing the pressure to said strip-like area applying pressure to the metal adjacent thereto and extending beyond the periphery of said first member, thereby to embed said first member into and flush with said second member and to pressure weld said members at said area.

2. A method of securing a metal disc to a metal member of like thickness, both said disc and member consisting of cold pressure weldable material, comprising providing the areas of contact to be joined with uncontaminated metallic surfaces, supporting said disc by a surface extending beyond its periphery, placing said member upon said disc with the cleaned areas in contacting relation, applying without the use of external welding heat to an interrupted ring-shaped welding area of said member within the periphery of and concentric with said disc and having a width about 1.5 times said thickness a pressure, to effect an indentation at said area and to create an interfacial metal flow conducive to pressure welding of said disc and member thereat, and while continuing the pressure to said strip-like area applying pressure to the metal adjacent thereto and extending beyond the periphery of said disc, to embed said disc into and flush with said member and to effect a final metal reduction at said area of at least 70% of the total initial metal thickness of said disc and member, thereby to pressure weld said members at said area.

3. A method of securing a stud having an adjacent circular flange to a perforated plate-like member, both said stud and member consisting of cold pressure weldable material, comprising providing an area of said member and the area of said flange adjacent to said stud with uncontaminated metallic surfaces, placing said member upon said flange with said stud passing through the member and with the cleaned areas of said flange and member in contacting relation, supporting said flange by a surface extending beyond its periphery, applying without the use of external welding heat to an interrupted ring-shaped welding area of said member within the periphery of and concentric with said flange a pressure, to effect an indentation at said area and to create an interfacial metal flow conducive to pressure welding of said flange and member thereat, and while continuing the pressure to said strip-like area applying pressure to the metal adjacent thereto and extending beyond the periphery of said flange, to embed said flange into and flush with said member and to pressure weld said flange to said member at said area.

References Cited in the file of this patent

UNITED STATES PATENTS

| | | |
|---|---|---|
| 1,296,651 | Gravell | Mar. 11, 1919 |
| 1,482,818 | Shipman | Feb. 5, 1924 |
| 1,736,539 | Lachman | Nov. 19, 1929 |
| 2,522,408 | Sowter | Sept. 12, 1950 |